United States Patent Office 2,994,683
Patented Aug. 1, 1961

2,994,683
GRAFT COPOLYMERS OF AN ACRYLIC ACID ESTER/BUTADIENE COPOLYMER, STYRENE AND ACRYLONITRILE
William C. Calvert, Gary, Ind., assignor to Borg-Warner Corporation, Chicago, Ill., a corporation of Illinois
No Drawing. Continuation of application Ser. No. 691,800, Oct. 23, 1957. This application Dec. 30, 1959, Ser. No. 862,794
7 Claims. (Cl. 260—45.5)

This application is a continuation of application Serial No. 691,800, filed October 23, 1957, now abandoned, for Graft Copolymers of an Acrylic Acid Ester/Butadiene Copolymer, Styrene and Acrylonitrile.

The present invention relates to graft copolymers of an acrylic acid ester/butadiene copolymer, styrene and acrylonitrile. As used in this specification, and as defined in the Report on Nomenclature of the International Union of Pure and Applied Chemistry, Journal of High Polymer Science, volume 8, page 260, the term "graft copolymer" designates a high polymer, the molecules of which consist of two or more polymer parts of different compositions, chemically united together. A graft copolymer may be produced, for example, by polymerization of a given kind of monomer with subsequent polymerization of another kind of monomer onto the product of the first polymerization. Most conveniently, graft copolymerization reactions are conducted by the emulsion polymerization technique although it is possible, but generally much less convenient, to produce graft copolymers by other operating procedures. In the emulsion polymerization technique for the production of graft copolymers a latex (usually aqueous) of the polymeric "backbone" is first prepared by the emulsion polymerization of a suitable monomer or mixture of monomers. To the resulting latex is then added the monomer or mixture of monomers to be graft copolymerized onto the previously formed polymeric backbone and the resulting mixture is allowed to interact under polymerizing conditions to form the graft copolymer.

While the fine details of the mechanism of graft copolymerization have not all been fully elucidated as yet, in the broad aspects thereof a portion of the monomer (or mixture of monomers) added to the preformed backbone polymer unite with this polymer at various reactive points on the extended molecule thereof to form side chains which continue to grow as the polymerization reaction proceeds. Other portions of the added monomer polymerize to form homopolymers and a portion of these homopolymer molecules may react with the preformed polymer as previously described. If a mixture of monomers is added to the preformed polymer, a portion of the mixture copolymerizes and a portion of the resulting copolymer molecules may react with the polymeric backbone as previously described. In addition, a greater or lesser portion (under some conditions, a very considerable portion) of homopolymer molecules formed from a single monomer or copolymer molecules formed from a mixture of two or more monomers, does not react with the polymeric backbone but, instead, such homopolymer or copolymer molecules continue to grow in the reaction mixture until they reach their termination point and are finally recovered from the reaction mixture as such homopolymers and/or copolymers in intimate admixture with the graft copolymer also formed. Similarly, any polymeric backbone molecules that may have escaped reaction with the added monomer or monomers (including homopolymers and/or copolymers formed therefrom) is eventually recovered from the reaction mixture as such, again in intimate admixture with the other polymeric products formed.

From the above discussion it is evident that for graft copolymerization to occur it is essential that the polymeric backbone possess reactive points on the extended molecule thereof. Polymer molecules of this type are frequently characterized as "unsaturated," this term here having a somewhat broader connotation than usual, embracing not only polymers possessing chemically unsaturated groupings but also polymers having "active" or "labile" hydrogen atoms (for example) on the extended molecules thereof. If the polymeric backbone molecules do not possess such reactive points (i.e. the polymeric molecules are "saturated"), graft copolymerization reactions are not possible. It is evident that if a monomer (or mixture of monomers) is added to a preformed polymer that does not possess reactive points on the extended molecule thereof and the resulting mixture is allowed to react under polymerizing conditions there is finally recovered from the reaction mixture no more than the original preformed polymer and the homopolymers and/or copolymers produced by the polymerization of the added monomer or monomer mixture, all in intimate admixture.

However, the essential requirement that the polymeric backbone must possess reactive points on the extended molecule thereof for graft copolymerization to occur results in the production of polymeric products that do not exhibit environmental stability to the degree that is desirable. The resulting graft copolymers still possess some reactive points on the extended molecule thereof which result in a more or less rapid deterioration of the polymeric product on aging, the deterioration being especially rapid when the polymeric product is exposed to sunlight.

I have discovered that use in graft copolymerization of a preformed polymeric backbone prepared by the copolymerization of a mixture of (a) a major portion of a monomer which, when polymerized alone, produces a "saturated" polymer and (b) a minor portion of a monomer which, when polymerized alone, produces an "unsaturated" polymer, produces a graft copolymer exhibiting superior aging characteristics in comparison with graft copolymers of the prior art. As a corollary of this discovery, I have found further that similarly suitable polymeric backbones are produced by the graft copolymerization of a monomer which, when polymerized alone, produces a "saturated" polymer, onto a comparatively minor amount of an "unsaturated" polymer. The resulting graft copolymer, when employed as the polymeric backbone in a subsequent conventional graft copolymerization reaction, produces a final graft copolymer exhibiting superior aging characteristics in comparison with graft copolymers of the prior art.

An object of this invention is to provide polymeric products exhibiting a high degree of environmental stability.

Another object of this invention is to provide polymeric products exhibiting a high degree of environmental stability produced by the graft copolymerization technique.

A further object of this invention is to provide an improved process for the production of polymeric products by the graft copolymerization technique.

Additional objects of this invention will become apparent as the description thereof proceeds.

For the better understanding of this invention a number of illustrative but non-limiting examples relating thereto are presented. Most of these examples comprise illustrative and non-limiting specific embodiments of this invention but in some instances results obtained by following prior art teachings are presented and compared with the improved results that are obtained by following the teachings of the present invention.

Examples 1–3

Three separate butyl acrylate-butadiene copolymers were prepared using the following recipes (expressed in parts by weight):

| Example | 1 | 2 | 3 |
|---|---|---|---|
| Butyl acrylate | 98 | 95 | 90 |
| Butadiene | 2 | 5 | 10 |
| Tergitol Penetrant No. 4 | 2.65 | 2.65 | 2.65 |
| Potassium persulfate | 0.5 | 0.5 | 0.5 |
| Distilled water | 200 | 200 | 200 |

In the above table, Tergitol penetrant No. 4 is sodium tetradecyl sulfate.

For each example, the appropriate recipe as set forth above was charged into a pressure tight reactor which was then rotated in a water bath heated to 95° C. for about four hours at which time conversion to the aqueous copolymer latex was essentially complete.

By the above procedure three separate aqueous latices of polymeric backbones, differing slightly in composition, were obtained. Each of these latices was individually subjected to a graft copolymerization reaction but since the operating techniques and additional reactants (both with respect to identity and amount) were the same in all three instances, the following single recipe and description will serve to cover each one of the three separate operations.

The following materials (expressed in parts by weight) were placed in a reactor provided with a reflux condenser, stirrer and an entrance port for the subsequent introduction of additional materials:

Butyl acrylate-butadiene copolymer (dry basis).
 From Example 1 or 2 or 3 _____ 60.0
Dresinate 731 (100% basis) _____ 5.6
Sodium pyrrophosphate _____ 0.6
Sodium hydroxide _____ 0.3
Daxad 11 _____ 0.25
Dextrose _____ 2.0
Distilled water [1] _____ 400.0

[1] Total, including water present in the butyl acrylate-butadiene copolymer aqueous latex.

In the above table Dresinate 731 is the sodium salt of hydrogenated, disproportionated rosin. Daxad 11 is polymerized sodium salts of alkyl naphthalene sulfonic acids.

The contents of the reactor were stirred and heated to 65° C. by means of a water bath surrounding the reactor and when this temperature was reached a solution of 0.025 part by weight ferrous sulfate heptahydrate and 0.2 part by weight ethylenediamine tetraacetic acid sodium salt dissolved in five parts by weight of water was added to the reactor. Following this addition, there was added to the reactor over a period of one hour a mixture (expressed in parts by weight) comprising:

Styrene _____ 90
Acrylonitrile _____ 50
Cumene hydroperoxide _____ 1.5

During this addition of the mixture of polymerizable monomers and catalyst the temperature within the reactor was maintained at 65° C. and after addition of this mixture was complete the reactor contents were maintained at this temperature level for one more hour. At the end of this time reaction was complete as evidenced by the fact that steam distillation of a sample of the final latex carried no monomer overhead.

After reaction was complete, 2.5 parts by weight 2,2'-methylene bis (4-methyl 6-tertiary butyl phenol) (antioxidant) were added to the reaction mixture which was then cooled to room temperature. The aqueous latex was coagulated by pouring into 1200 parts by weight water containing two parts by weight sodium chloride, two parts by weight alum and four parts by weight sulfuric acid. The resulting coagulated mixture was heated to 95° C. to facilitate subsequent filtering and washing operations and the coagulum was separated by filtration, water washed, and finally dried at 65° C.

The three graft copolymers so produced were individually milled on a two roll rubber mill (roll temperature, 320° F.). All three exhibited good milling properties and molded sheets of the individual products were prepared for determination of physical properties. Certain physical test data obtained on the resulting translucent molded sheets are tabulated below:

| Graft copolymer of | Example 1 | Example 2 | Example 3 |
|---|---|---|---|
| Notched Izod Impact Value (22.8° C.) Ft. Lbs./Inch Notch (A.S.T.M. D758-48) | 6.5 | 3.1 | 1.5 |
| Heat Distortion Temperature, °C. (A.S.T.M. D648-45T) | 96 | 94 | 92 |
| Rockwell Hardness, R Scale (A.S.T.M. D785-51) | 74 | 74 | 87 |

It is seen that the impact value of the graft copolymers decreased from a high value to a moderate value as the proportion of butadiene in the butyl acrylate-butadiene copolymer increased. Even the only moderate impact value obtained when butadiene:butyl acrylate were employed in 1:9 radio is considered to be adequate for most applications requiring good resistance to breakage. The heat distortion temperature (softening point) is at a satisfactory high level for all three polymers; the temperature apparently decreases slightly as the amount of polybutadiene present in the butyl acrylate-butadiene copolymer increases. The surface hardness of the polymers is at a satisfactory high level. There is an apparent large increase in the surface hardness as the butadiene:butyl acrylate ratio is increased from 1:19 to 1:9.

One of the most interesting and important properties exhibited by the graft copolymers of these examples is that they do not develop surface crazing on exterior exposure to sunlight. It is easily possible to produce graft copolymers using a straight "unsaturated" polymer backbone that exhibit impact values, heat distortion temperatures (softening points) and surface hardnesses at least as high as those of the graft copolymers of the present examples but on exterior exposure to sunlight these polymers rapidly develop surface crazing.

It will be noted that the composition of the final graft copolymeric products of the above examples, expressed as percent by weight of the polymer backbone (dry basis) and monomers employed in the graft copolymerization operation, is 30% of the butyl acrylate-butadiene copolymer backbone, 45% styrene and 25% acrylonitrile. As would be expected, useful products are produced over a range in the proportions of these three ingredients. Thus, useful products are produced when using butyl acrylate-butadiene copolymers within the range (expressed as previously specified) 20 to 60%, corresponding to a range of 80 to 40% for the total of the styrene plus acrylonitrile mixture. The styrene ingredient may comprise from 30 to 70% of the final graft polymer while the acrylonitrile ingredient preferably comprises from 20 to 30% of the final graft polymer but may be as low as 10% if desired.

Graft copolymers essentially similar to those of the present examples may be prepared by replacing a portion of all the butadiene employed in making the butyl acrylate-butadiene copolymer by an equivalent amount of other conjugated dienes. Among such other dienes may be mentioned 2-chlorobutadiene-1,3 (chloroprene), isoprene, piperylene, 2,3-dimethyl butadiene-1,3 methyl pentadienes, and the like.

Likewise, graft copolymers essentially similar to those of the present examples may be prepared by replacing a portion of all the styrene employed by an equivalent amount of other aromatic compounds such as alpha methyl styrene, vinyl toluene, alpha methyl p-methyl styrene, and the like.

Finally, graft copolymers essentially similar to those of the present examples may be prepared by replacing a portion or all of the acrylonitrile employed in the graft copolymerization reaction by an equivlaent amount of methacrylonitrile.

*Example 4*

This example is presented for the purpose of demonstrating that in order to obtain graft copolymers exhibiting the properties outlined in the previous examples it is essential that a minor amount of a conjugated diene be employed to modify the butyl acrylate.

The operating procedure followed in the present example is essentially the same as that described in detail in connection with Examples 1–3 hereof. Accordingly, the exposition of the present example will be largely confined to reciting differences in reactants, properties of the product, etc., between the present example and Examples 1–3.

The following recipe (expressed in parts by weight) was employed to prepare the poly-butyl acrylate backbone:

| | |
|---|---:|
| Butyl acrylate | 100 |
| Tergitol penetrant No. 4 | 2.65 |
| Potassium persulfate | 0.0166 |
| Distilled water | 200 |

Since this reaction mixture did not contain any butadiene (gaseous at room temperature) polymerization was here conducted at the refluxing temperature of the mixture (90–97° C.). After 1.25 hours at this temperature the reaction was essentially complete as determined by coagulating a weighed sample of the resulting reaction mixture and separating, washing, drying and weighing the coagulum.

For the subsequent polymerization reaction a sufficient portion of the aqueous latex, produced as above set forth, to contain 60 parts by weight (dry basis) poly-butyl acrylate was taken and further processed exactly as described in connection with the polybutadiene modified poly-butyl acrylate latices of Examples 1–3 and the resulting polymer was isolated from the final reaction mixture exactly as previously described.

When an attempt was made to mill the dry polymeric product of the present example on a two roll rubber mill (roll temperature 320° F.) it exhibited very poor milling properties. The resulting sheet exhibited marked shrinkage after removal from the mill and gave other evidence of being a mere mechanical mixture of incompatible materials. However, molded samples of the material were prepared and subjected to physical testing by the same methods set forth in Examples 1–3 hereof.

The data obtained in these tests are set forth below:

| | |
|---|---:|
| Notched Izod impact value, ft. lbs./inch notch | 10.2 |
| Heat distortion temperature, ° C | 93.0 |
| Rockwell hardness, R scale | 49.0 |

While this material has a very high impact value and a high heat distortion temperature (softening point), the low surface hardness thereof coupled with its very poor milling properties excludes the material from consideration as a useful commercial product. The poor milling properties, low surface hardness and lack of clarity of the product of this example, all indicate that this material is at least essentially a mere mechanical mixture of poly-butyl acrylate and styrene-acrylonitrile copolymer.

*Example 5*

This example is quite similar to Examples 1–3 hereof, the major change involving the use of ethyl acrylate instead of butyl acrylate.

The following recipe, expressed in parts by weight, was employed to prepare the ethyl acrylate-butadiene copolymer:

| | |
|---|---:|
| Ethyl acrylate | 99.0 |
| Butadiene | 1.0 |
| Tergitol penetrant No. 4 | 2.65 |
| Potassium persulfate | 0.5 |
| Distilled water | 200.0 |

The copolymerization was conducted in the pressure tight reactor described in Examples 1–3 and was essentially complete after four hours at 70° C.

The operating techniques and reaction conditions employed in the graft polymerization reaction were identical to those employed in Examples 1–3 but there was some differences in reactants as set forth below.

The primary graft copolymerization mixture (in parts by weight) consisted of:

| | |
|---|---:|
| Ethyl acrylate-butadiene copolymer prepared as above (dry basis) | 60.0 |
| Dresinate 731 (100% basis) | 5.6 |
| Sodium pyrophosphate | 0.6 |
| Sodium hydroxide | 0.3 |
| Dextrose | 2.0 |
| Distilled water [1] | 400.0 |

[1] Total, including water present in the ethyl acrylate-butadiene copolymer aqueous latex.

After heating this mixture to 65° C. as previously described, a solution of 0.025 part by weight ferrous sulfate heptahydrate and 0.2 part by weight ethylenediamine tetraacetic sodium salt dissolved in five parts by weight water was added.

The monomer-catalyst mixture used here consisted of (in parts by weight):

| | |
|---|---:|
| Styrene | 90 |
| Acrylonitrile | 50 |
| Cumene hydroperoxide | 2.1 |

This mixture was added as described in Examples 1–3 and the further processing thereof and the isolation of the polymeric product followed the procedures of these earlier examples.

The dry graft copolymer exhibited good milling properties and 0.08 inch sheets thereof were fairly clear. The product exhibited a moderately high impact value and a high and satisfactory surface hardness and heat distortion temperature (softening point) as the following data show:

| | |
|---|---:|
| Notched Izod impact value, ft. lbs./inch notch | 1.4 |
| Rockwell hardness, R scale | 78 |
| Heat distortion temperature, ° C | 90.5 |

This graft copolymer does not develop surface crazing on exterior exposure to sunlight.

The approximate limits of the ranges of the ingredients employed in the preparation of the graft copolymer within which useful products may be obtained have been previously set forth in connection with Examples 1–3. Likewise various equivalents of the butadiene, styrene and acrylonitrile that may be employed in the preparation of the final graft copolymer are listed in connection with Examples 1–3 hereof.

*Examples 6 and 7*

These examples illustrate the modification of polymerized acrylic acid esters by the graft copolymerization of acrylic acid esters onto a preformed polymer of a conjugated diene.

Two separate polymeric backbones were prepared by the graft copolymerization of butyl acrylate onto a preformed aqueous polybutadiene latex, using the following recipes, expressed in parts by weight:

| Example | 6 | 7 |
| --- | --- | --- |
| Polybutadiene (dry basis) | 20 | 10 |
| Butyl acrylate | 80 | 90 |
| Tergitol Penetrant No. 4 | 2.65 | 2.65 |
| Potassium persulfate | 0.0166 | 0.0166 |
| Distilled water [1] | 200 | 200 |

[1] Total, including water present in the aqueous polybutadiene latex.

In the above table the polybutadiene used was a aqueous polybutadiene latex of about 55% solids content and a pH of 9.5–11.0.

The above recipes were separately polymerized in a reactor provided with an agitator and reflux condenser, these reaction mixtures being heated to 95–97° C. by a water bath surrounding the reactor and were polymerized at this temperature under agitation until reaction was complete. In Example 6, due to the retarding effect of the rather large quantity of aqueous polybutadiene latex present, the reaction was rather far from completion after four hours so an additional charge of cumene hydroperoxide (0.0166 part by weight) was added and the reaction was continued for 3.5 hours more at which time the reaction was essentially complete. In Example 7, on the other hand, the polymerization reaction was essentially complete after only 3.5 hours at reaction temperature.

The graft copolymerization reactions were carried out exactly as described in connection with Examples 1–3, both with respect to operating techniques and nature and quantities of reactants, with the important but obvious exception that in Example 6 sufficient of the aqueous graft copolymer latex, prepared as above described under Example 6 to furnish 60 parts by weight (dry basis) of the polymer, and in Example 7 sufficient of the aqueous graft polymer latex, prepared as above described under Example 7, to furnish 60 parts by weight (dry basis) of the polymer, were respectively employed in place of the polybutadiene modified poly-butyl acrylate latices of Examples 1–3.

The isolation and further processing of the final polymeric products also followed the procedures described in Examples 1–3. Various physical properties and miscellaneous observations on the graft copolymers produced are tabulated below:

| Example | 6 | 7 |
| --- | --- | --- |
| Notched Izod Impact Value, Foot Pounds/ Inch Notch | 6.1 | 9.0 |
| Heat Distortion Temperature, °C | 93 | 94 |
| Rockwell Hardness, R Scale | 84 | 85 |
| Milling Properties | Fair | Poor |
| Clarity | Very Poor | Fair |

Both of these graft copolymers are materials of high impact value, high heat distortion temperature (softening point) and high surface hardness. While these materials can be milled, their milling properties leave much to be desired and they are deficient with respect to clarity. Neither of these graft copolymers deteriorate on exterior exposure to sunlight.

A portion or all of the aqueous polybutadiene latex employed in the present examples may be replaced by an aqueous latex containing an equivalent amount of other conjugated diene polymers. Thus, aqueous latices of polychloroprene, polyisoprene, polypiperylene, poly-dimethyl butadiene and polymerized methyl pentadienes, and the like, may replace part or all of the polybutadiene latex.

The approximate limits of the ranges of the three ingredients employed in the preparation of the final graft polymer within which useful products may be obtained have previously been set forth in connection with Examples 1–3 hereof. Likewise, various equivalents of the styrene and acrylonitrile employed in the preparation of the final graft polymer are listed in connection with Examples 1–3 hereof.

Useful products are obtained in accordance with the present invention when the ratio of ethyl or butyl acrylate to conjugated diene in the preparation of the copolymers of Examples 1–3 inclusive and 5 is 90% to 99% by weight of the acrylate and correspondingly 10% to 1% by weight of the conjugated diene. With respect to the graft copolymer backbone of Examples 6 and 7, useful products are obtained when the ratio of ethyl or butyl acrylate to conjugated diene polymer is 75% to 95% by weight of the acrylate and correspondingly 25% to 5% by weight of the conjugated diene polymer.

Be it remembered, that while this invention has been described in connection with specific details of specific embodiments thereof, these are illustrative only and are not to be considered limitations on the spirit or scope of the said invention except insofar as these may be incorporated in the appended claims.

I claim:

1. A graft copolymer product of
   A. a material selected from the group consisting of (1) a copolymer of from 90% to 99% by weight of a material selected from the group consisting of ethyl acrylate and butyl acrylate and, correspondingly, 10% to 1% by weight of a conjugated diene, and (2) a graft copolymer of from about 75% to about 95% by weight of a material selected from the group consisting of ethyl acrylate and butyl acrylate and, correspondingly, 25% to 5% by weight of a conjugated diene polymer, and
   B. a material selected from the group consisting of styrene, vinyl toluene, alpha methyl styrene and alpha methyl p-methyl styrene, and
   C. a material selected from the group consisting of acrylonitrile and methacrylonitrile, said graft copolymer product embracing, on the 100 parts dry weight graft copolymer basis, from about 20 parts to about 60 parts by weight (dry basis) of the combined material selected from group (A), from about 30 parts to about 70 parts by weight of the combined material selected from group (B) and from about 10 parts to about 30 parts by weight of the combined material selected from group (C).

2. A graft copolymer of
   A. a copolymer of from 90% to 99% by weight of ethyl acrylate and, correspondingly, 10% to 1% by weight of a conjugated diene, and
   B. a material selected from the group consisting of styrene, vinyl toluene, alpha methyl styrene and alpha methyl p-methyl styrene, and
   C. a material selected from the group consisting of acrylonitrile and methacrylonitrile, the said graft copolymer embracing, on the 100 parts dry weight graft copolymer basis, from about 20 parts to about 60 parts by weight (dry basis) of the combined material of group (A), from about 30 parts to about 70 parts by weight of the combined material selected from group (B) and from about 10 parts to about 30 parts by weight of the combined material selected from group (C).

3. A graft copolymer of (A) a copolymer of from 90% to 99% by weight of butyl acrylate and, correspondingly, 10% to 1% by weight of a conjugated diene, and (B) styrene and (C) acrylonitrile, said graft copolymer embracing, on the 100 parts dry weight graft copolymer basis, from about 20 parts to about 60 parts by weight (dry basis) of the combined material of group (A), from about 30 parts to about 70 parts by weight of combined styrene and from about 10 parts to about 30 parts by weight of combined acrylonitrile.

4. A graft copolymer of (A) a copolymer of from 90% to 99% by weight of ethyl acrylate and, correspondingly, 10% to 1% by weight of butadiene, and (B) styrene and (C) acrylonitrile, said graft copolymer embracing, on the 100 parts dry weight graft copolymer basis, from about 20 parts to about 60 parts by weight (dry basis) of the combined material of group (A), from about 30 parts to about 70 parts by weight of combined styrene and from about 10 parts to about 30 parts by weight combined acrylonitrile.

5. A graft copolymer product of (A) an intermediate graft copolymer of from about 75% to 95% by weight of ethyl acrylate and, correspondingly, 25% to 5% by weight of polybutadiene, (B) styrene and (C) acrylonitrile, said graft copolymer product embracing, on the 100 parts dry weight graft copolymer basis, from about 20 parts to about 60 parts by weight (dry basis) of the combined material selected from group (A), from about 30 parts to about 70 parts by weight of combined styrene and from about 10 parts to about 30 parts by weight combined acrylonitrile.

6. A graft copolymer of
   A. a copolymer of from 90% to 99% by weight of butyl acrylate and, correspondingly, 10% to 1% by weight of a conjugated diene, and
   B. a material selected from the group consisting of styrene, vinyl toluene, alpha methyl styrene and alpha methyl p-methyl styrene, and
   C. a material selected from the group consisting of acrylonitrile and methacrylonitrile, the said graft copolymer embracing, on the 100 parts dry weight graft copolymer basis, from about 20 parts to about 60 parts by weight (dry basis) of the combined material of group (A), from about 30 parts to about 70 parts by weight of the combined material selected from group (B) and from about 10 parts to about 30 parts by weight of the combined material selected from group (C).

7. A graft copolymer product of (A) an intermediate graft copolymer of from about 75% to 95% by weight of butyl acrylate and, correspondingly, 25% to 5% by weight of polybutadiene, (B) styrene and (C) acrylonitrile, said graft copolymer product embracing, on the 100 parts dry weight graft copolymer basis, from about 20 parts to about 60 parts by weight (dry basis) of the combined material selected from group (A), from about 30 parts to about 70 parts by weight of combined styrene and from about 10 parts to about 30 parts by weight combined acrylonitrile.

References Cited in the file of this patent

UNITED STATES PATENTS

| | | |
|---|---|---|
| 2,232,515 | Arnold et al. | Feb. 18, 1941 |
| 2,356,091 | Roedel | Aug. 15, 1944 |
| 2,802,808 | Hayes | Aug. 13, 1957 |

FOREIGN PATENTS

| | | |
|---|---|---|
| 456,442 | Great Britain | Aug. 8, 1935 |
| 767,642 | Great Britain | Feb. 7, 1957 |
| 778,265 | Great Britain | July 3, 1957 |